May 19, 1964     J. E. ARMSTRONG ETAL     3,133,482
METHOD AND APPARATUS FOR FORMING CONTAINERS
Filed March 24, 1961     12 Sheets-Sheet 1
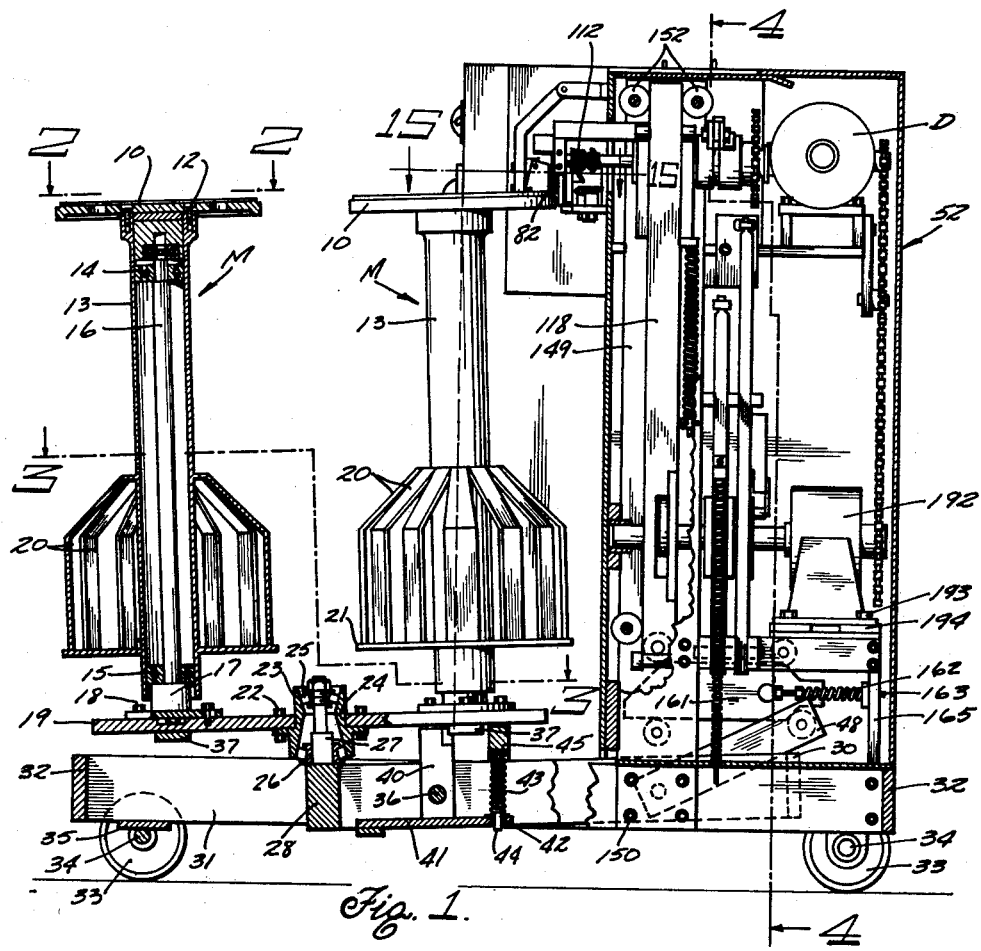
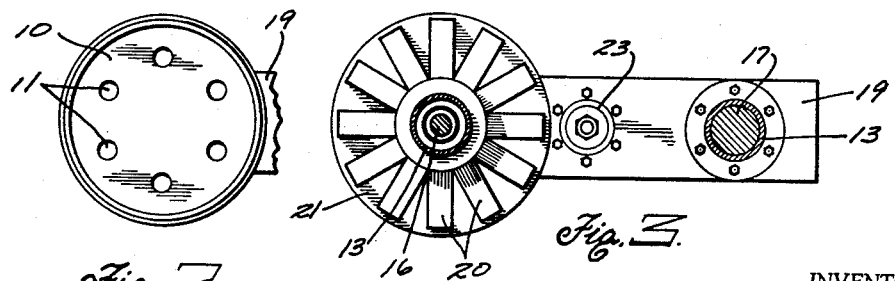
INVENTORS
JAMES E. ARMSTRONG
EDOUARD E. GSCHWIND
BY
J. F. TEIGLAND &
W. A. SCHAICH
ATTORNEYS

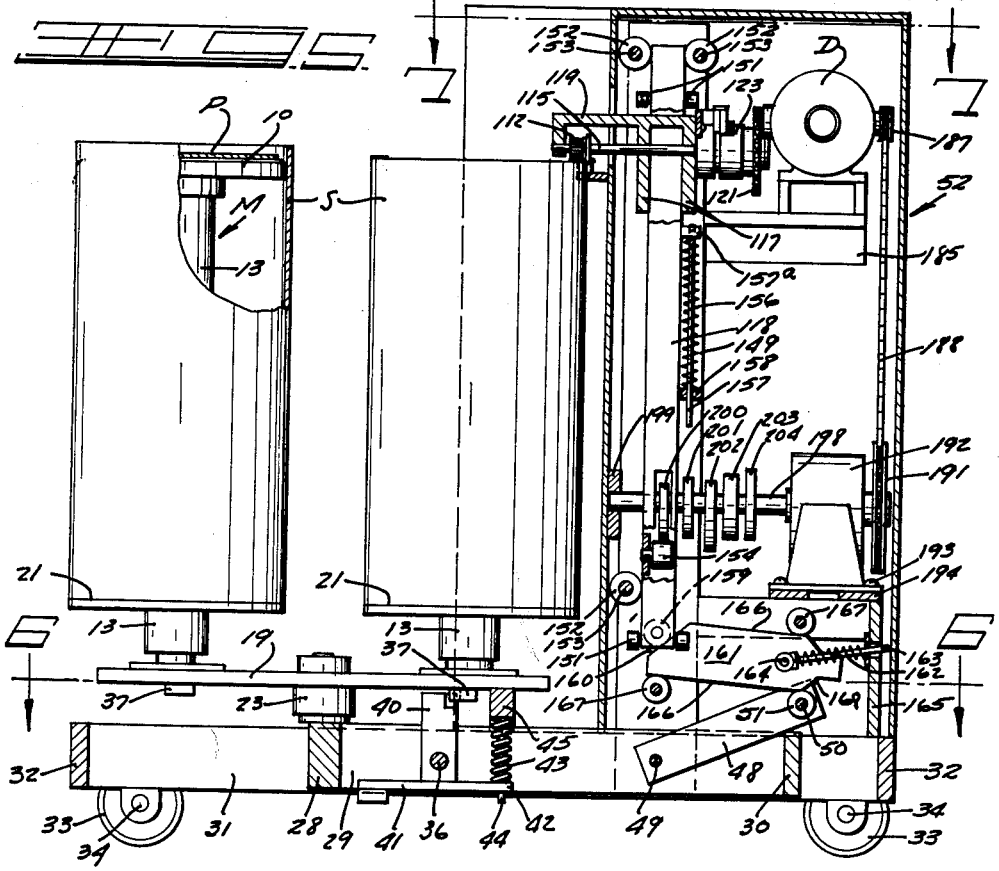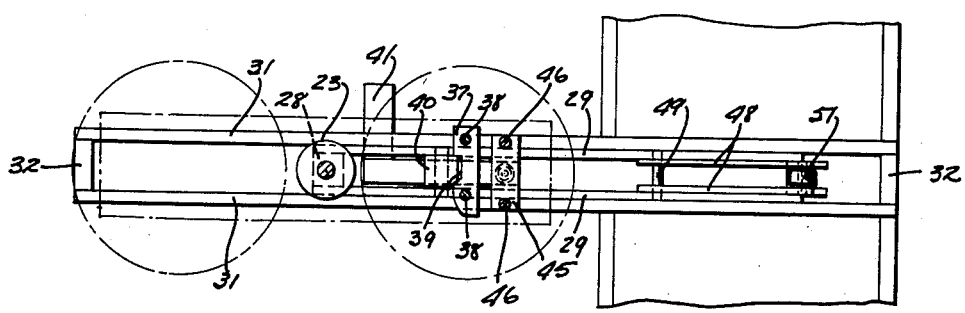

INVENTORS
JAMES. E. ARMSTRONG
EDOUARD E. GSCHWIND
BY
J. F. TEIGLAND &
W. A. SCHAICH
ATTORNEYS

May 19, 1964   J. E. ARMSTRONG ETAL   3,133,482
METHOD AND APPARATUS FOR FORMING CONTAINERS
Filed March 24, 1961                    12 Sheets-Sheet 5

INVENTORS
JAMES E. ARMSTRONG
EDOUARD E. GSCHWIND
BY
J. F. TEIGLAND &
W. A. SCHAICH
ATTORNEYS

May 19, 1964  J. E. ARMSTRONG ETAL  3,133,482
METHOD AND APPARATUS FOR FORMING CONTAINERS
Filed March 24, 1961  12 Sheets-Sheet 7
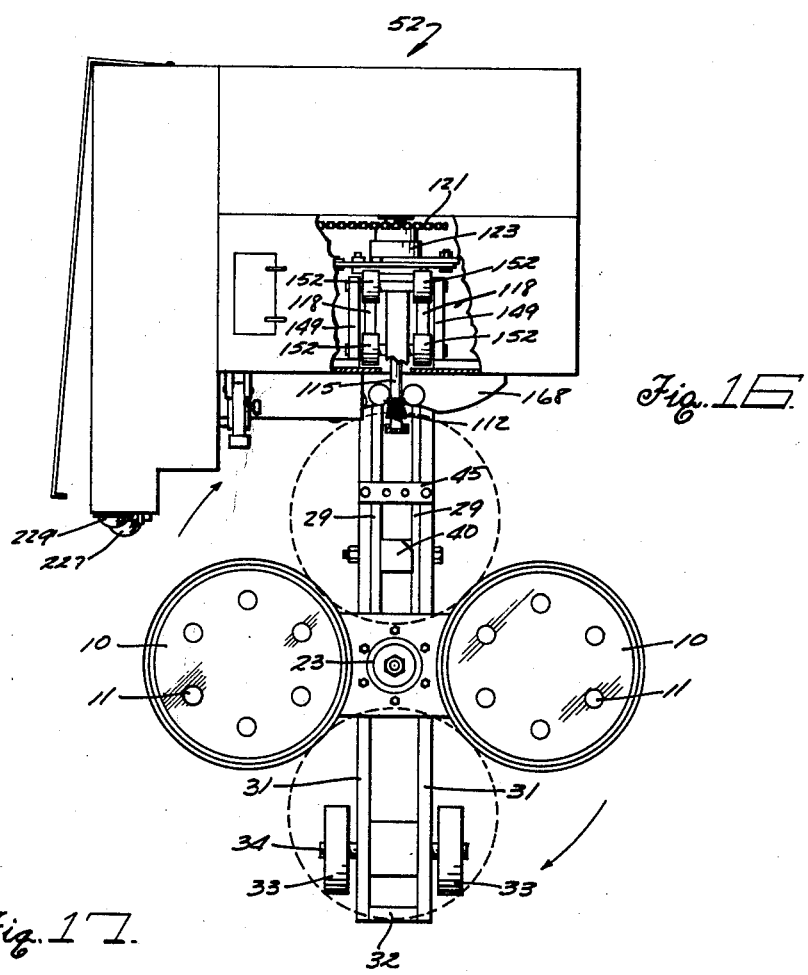
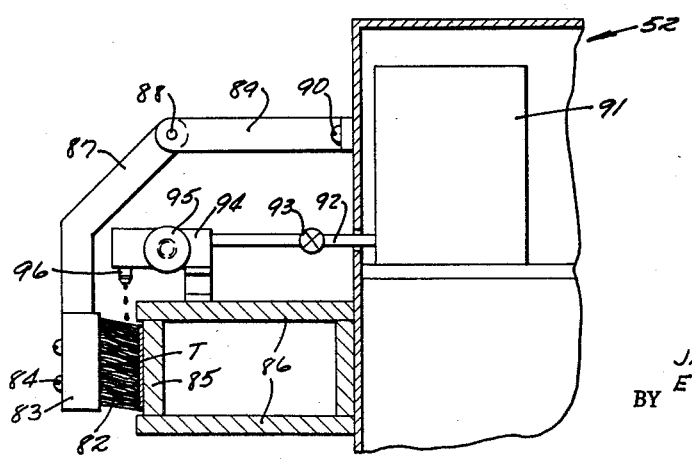
INVENTORS
JAMES E. ARMSTRONG
EDOUARD E. GSCHWIND
BY
J. F. TEIGLAND &
W. A. SCHAICH
ATTORNEYS

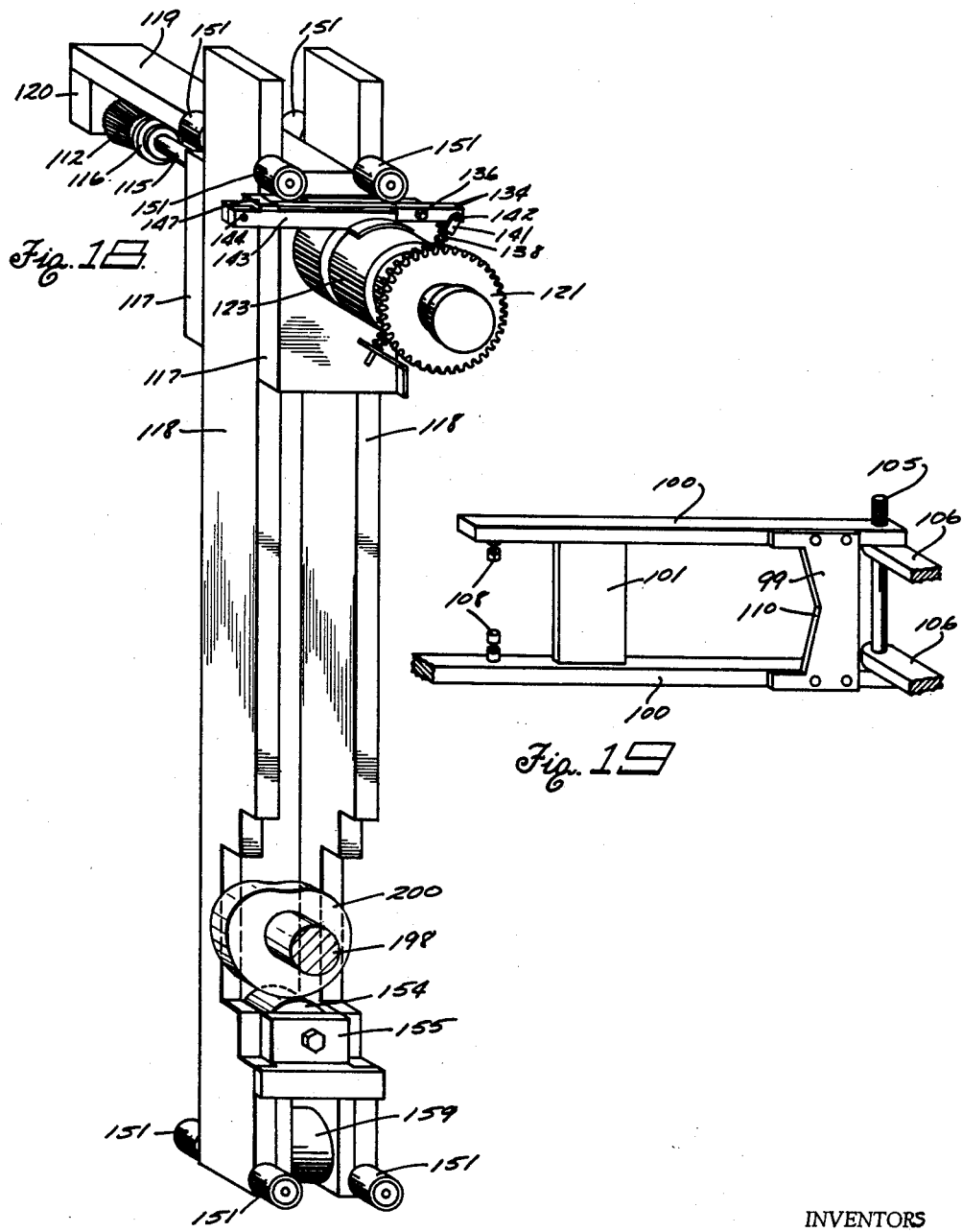

May 19, 1964 J. E. ARMSTRONG ETAL 3,133,482
METHOD AND APPARATUS FOR FORMING CONTAINERS
Filed March 24, 1961 12 Sheets-Sheet 9
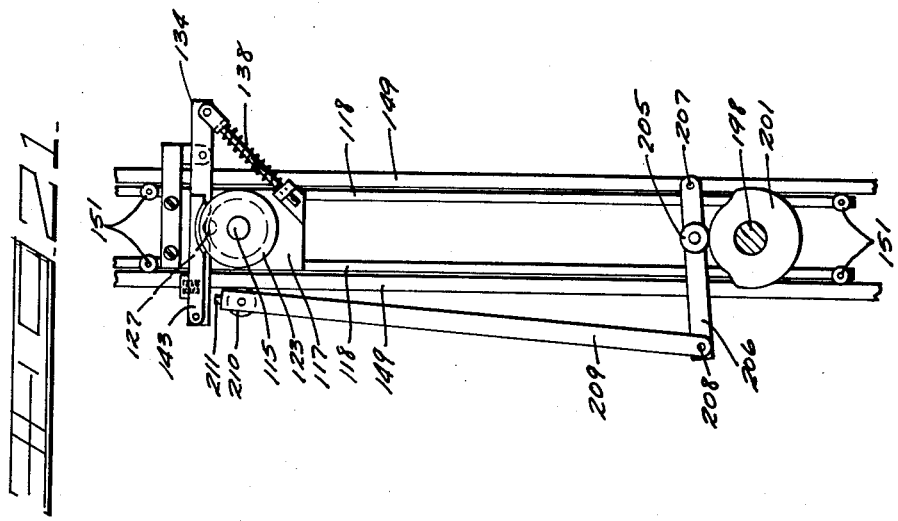
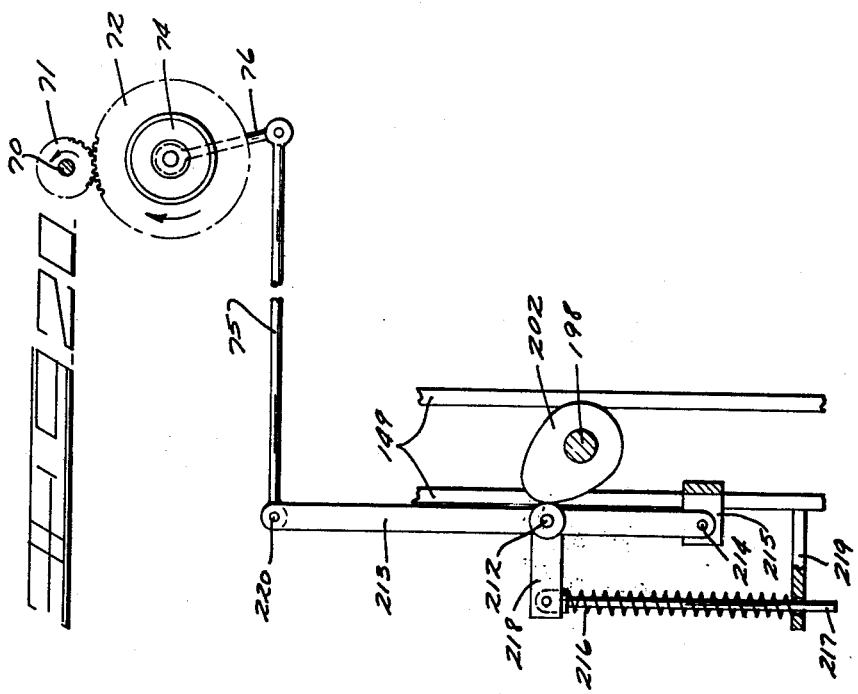
INVENTORS
JAMES E. ARMSTRONG
EDOUARD E. GSCHWIND
BY
J. F. TEIGLAND &
W. A. SCHAICH
ATTORNEYS

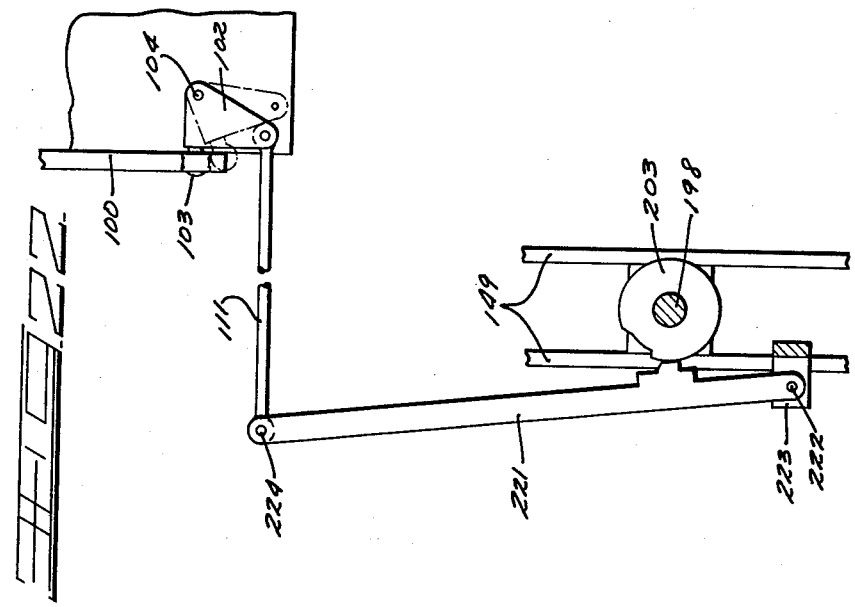
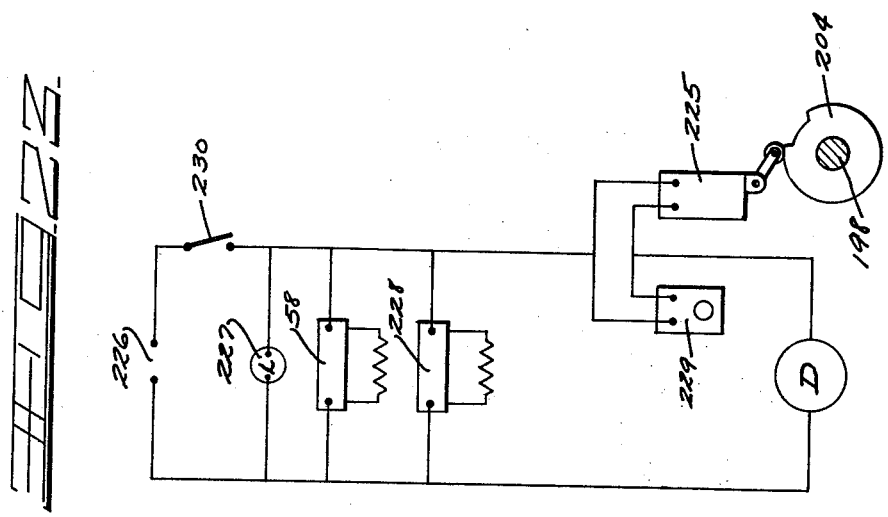
INVENTORS
JAMES E. ARMSTRONG
EDOUARD E. GSCHWIND
BY
J. F. TEIGLAND &
W. A. SCHAICH
ATTORNEYS

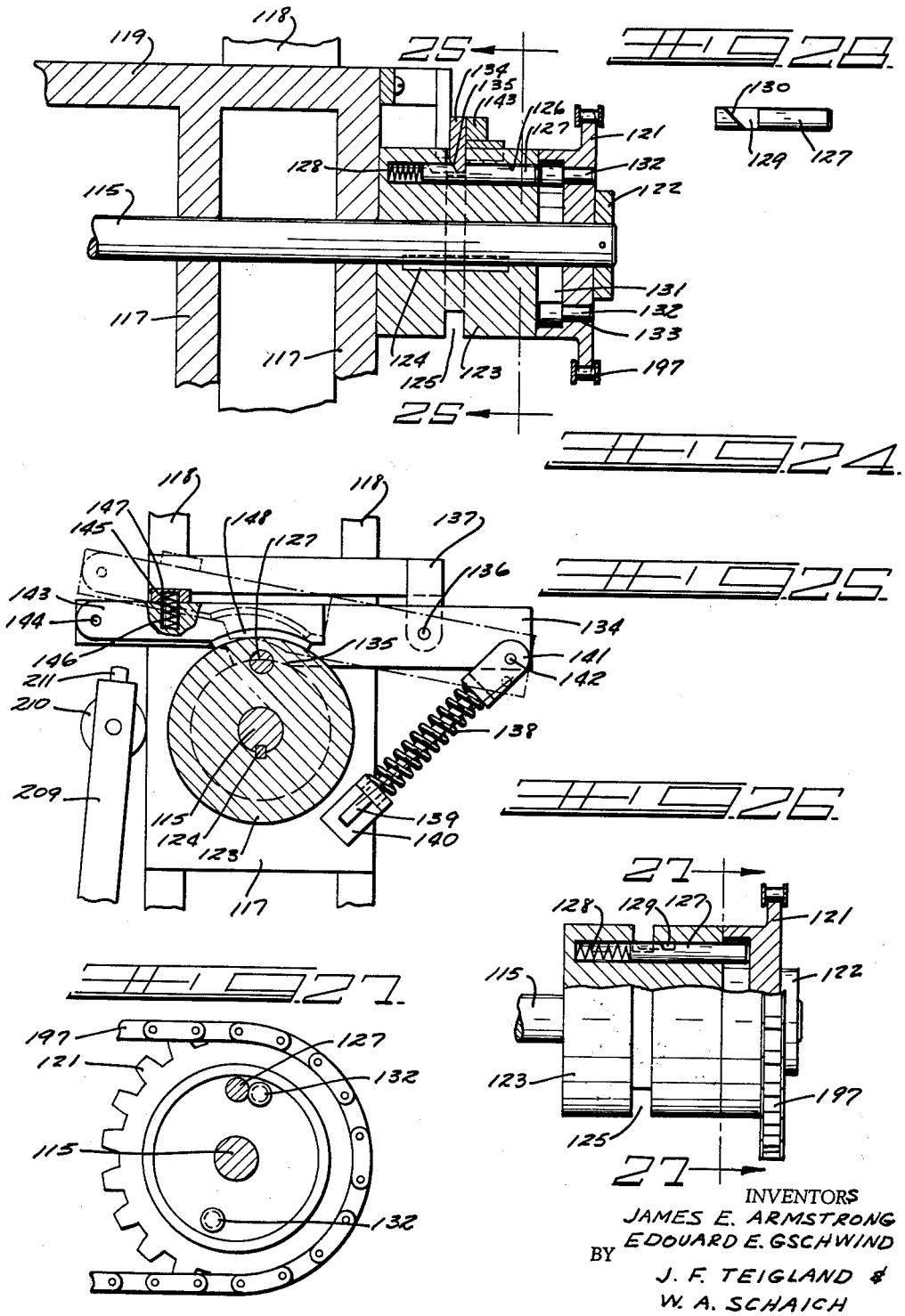

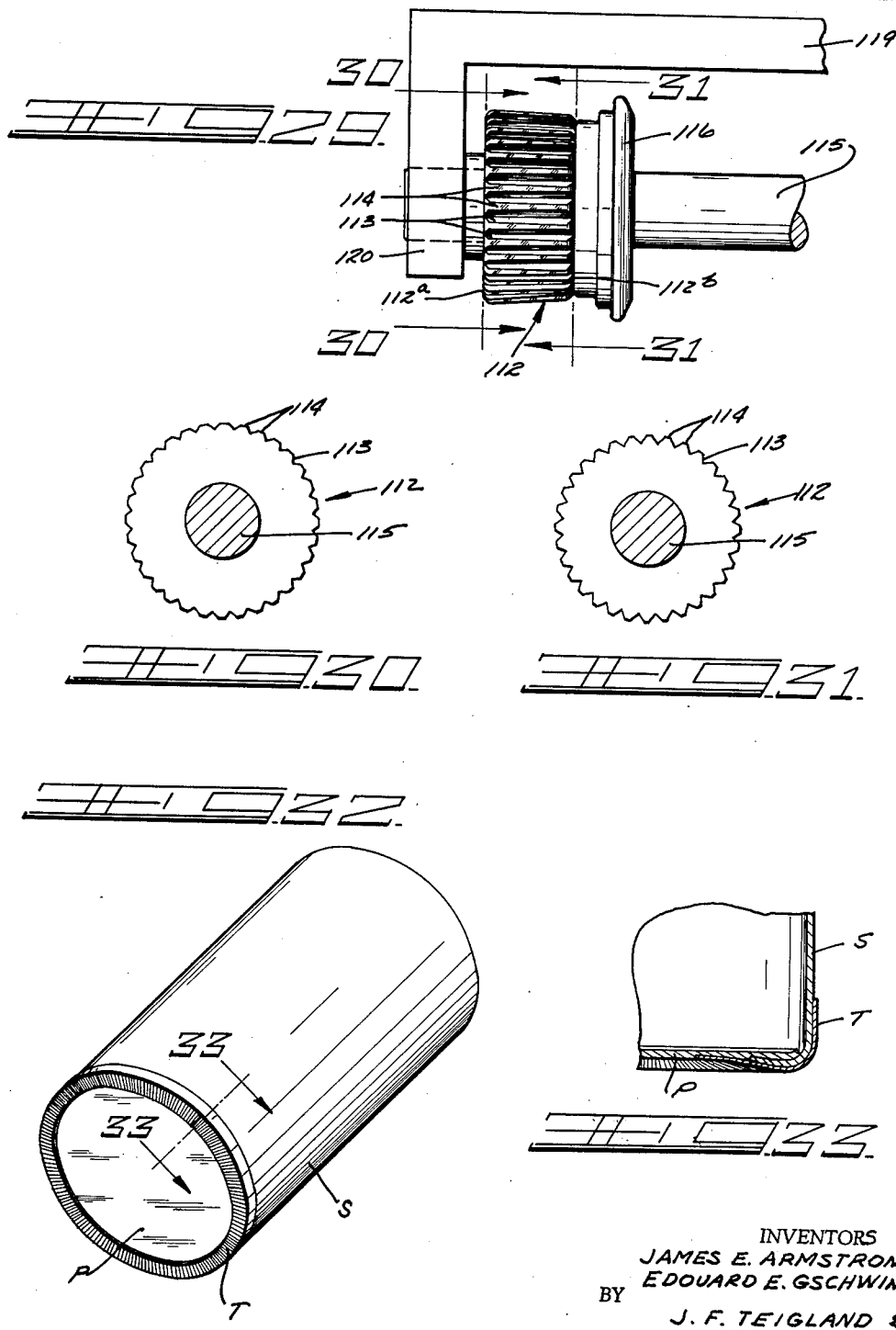

United States Patent Office 3,133,482
Patented May 19, 1964

3,133,482
METHOD AND APPARATUS FOR FORMING CONTAINERS
James E. Armstrong and Edouard E. Gschwind, Jacksonville, Fla., assignors to Owens-Illinois Glass Company, a corporation of Ohio
Filed Mar. 24, 1961, Ser. No. 98,156
39 Claims. (Cl. 93—55.1)

This invention relates generally to a method and apparatus for forming containers, and more particularly to a method and apparatus for forming drum-like containers having a liquid-tight end structure.

The present invention is primarily concerned with a method and apparatus for assembling a tubular sleeve, an end panel, and a length of tape into a drum-like container having a liquid-tight end structure. Briefly, the invention comprises inwardly folding a portion of the sleeve to form a ledge, placing the end panel in abutting relationship with the ledge, and sealing the juncture of the sleeve and end panel with a length of tape. The difficulty in forming a liquid-tight seal occurs when the area of sealing follows a curved path, such as is the case when the sleeve is circular in cross-section. When the area of sealing follows a curved path, the inner peripheral edges of the infolded portions of the sleeve and tape follow shorter paths than their respective outer peripheral edges. This results in the infolded portions of the sleeve and tape buckling and overlapping themselves to form a series of channels and voids which serve as passageways and prevent the formation of a liquid-tight seal.

The present invention comprises compressing the infolded portions of the sleeve and tape, and end panel together, preferably by means of a serrated forming wheel, into an annular series of radial undulations to place the infolded portions and end panel into continuous face-to-face contact, thereby creating a liquid-tight seal.

The method and apparatus of our invention can also be utilized to combine a tubular sleeve and an end panel into a liquid-tight container. This variation of our invention comprises inwardly folding a marginal portion of the sleeve to form a ledge, placing the end panel in abutting relationship to the ledge, and bonding and compressing the infolded portion of the sleeve and end panel into an annular series of radial undulations to form a liquid-tight seal.

Containers formed by the method and apparatus of our invention are especially useful for packaging liquid type products, such as molten asphalt, and finely divided, siftable products.

Accordingly, it is an object of our invention to provide a method of forming a drum-like container having a liquid-tight end structure.

Another object of our invention is to provide apparatus for efficiently and expeditiously forming a drum-like container having a liquid-tight end structure.

The specific nature of this invention, as well as other objects and advantages thereof, will become apparent to those skilled in the art from the following detailed description, taken in conjunction with the annexed sheets of drawings on which, by way of example only, the preferred embodiment of this invention is illustrated.

On the drawings:

FIG. 1 is a side elevational sectional view of the container forming apparatus;

FIG. 2 is a partial top plan view taken along the line 2—2 of FIG. 1;

FIG. 3 is a partial sectional view taken along the line 3—3 of FIG. 1;

FIG. 5 is a side elevational view, partly in section, showing the container forming apparatus;

FIG. 6 is a sectional view taken along the line 6—6 of FIG. 5;

FIG. 16 is a top plan view of the container forming apparatus with a portion thereof being broken away;

FIG. 17 is a sectional view taken along the line 17—17 of FIG. 14;

FIG. 18 is a perspective view showing the forming head assembly of the container forming apparatus;

FIG. 19 is a partial perspective view showing the knife assembly of the apparatus;

FIG. 20 is a partial rear elevational view showing the tape feed cam of the apparatus and its associated linkage;

FIG. 21 is a partial rear elevational view showing the clutch operating cam of the apparatus and its associated linkage;

FIG. 22 is a partial rear elevational view showing the cam for operating the knife assembly of the apparatus and its associated linkage;

FIG. 23 is a schematic diagram of the electrical circuitry of the container forming apparatus;

FIG. 24 is a sectional side elevational view of the clutch and brake assembly of the apparatus;

FIG. 25 is a sectional view taken along the line 25—25 of FIG. 24;

FIG. 26 is a side elevational view, partly in section, showing the clutch assembly of the apparatus;

FIG. 27 is a sectional view taken along the line 27—27 of FIG. 26;

FIG. 28 is a plan view of the clutch pin;

FIG. 29 is a partial side elevational view of the serrated forming wheel of the apparatus;

FIG. 30 is a front view of the serrated forming wheel of the apparatus taken along the line 30—30 of FIG. 29;

FIG. 31 is a rear view of the forming wheel of the apparatus taken along the line 31—31 of FIG. 29;

FIG. 32 is a perspective view of the completed container; and

FIG. 33 is a sectional view taken along the line 33—33 of FIG. 32.

*General Description*

Figure 4:
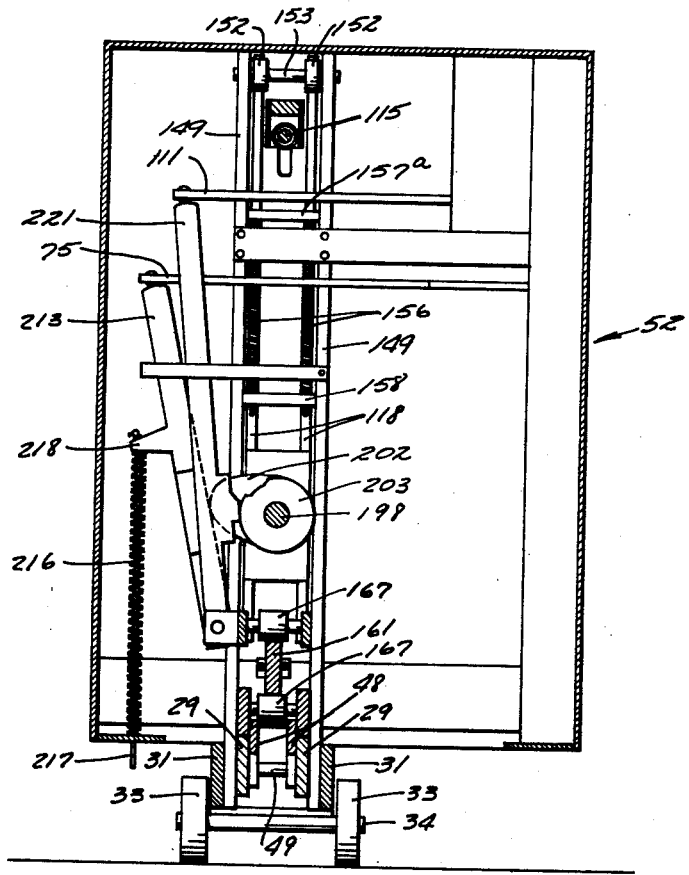
FIG. 4 is a sectional view taken along the line 4—4 of FIG. 1.

The three elements which are combined to form the preferred container are a sleeve S, an end panel P, and a length of tape T. The sleeve S is preferably an open-ended tube which is circular in cross-section. The sleeve is deformable and is preferably formed of paperboard or the like. The sleeve may be coated on its interior surface with a conventional coating which is compatible with or required by the contents of the container, such as a water-resistant coating. The end panel P is formed to fit snugly within the end of the sleeve. The end panel is also deformable and may be formed of paperboard or the like. The panel may be coated on its interior surface with a conventional coating similar to that used on the sleeve. The tape T used in our invention is preferably a paper tape which has an adhesive deposited on one side thereof. The adhesive is preferably a quick-setting tape which is chemically reacted by a wetting agent, such as water. It is to be understood, of course, that any conventional, deformable or flexible type of tape, such as a fabric tape, can be used, and a pressure sensitive adhesive or any other suitable conventional type of adhesive can be substituted for the preferred form.

The container forming apparatus comprises three main components which are operatively connected for sequential operation. They are the supporting means for rotatably mounting the sleeve S and end panel P, the means for supplying a predetermined length of wetted tape T to the forming area of the apparatus, and the forming means for combining the tape T, sleeve S, and end panel P into a liquid-tight, drum-type container. It may be noted that while the article is referred to as a container, it may also function as a telescoping cap-type closure.

*Supporting Means*

Referring to FIG. 1, the supporting means for supporting the sleeve S and end panel P comprises a pair of mandrels, generally designated by the letter M, mounted for rotational movement about their respective centers. Two mandrels are provided, so as to allow the operator of the apparatus to be loading and unloading one mandrel while a container is being formed on the other mandrel. The mandrels are secured to opposite ends of a swing bar, which will be described hereinafter, for pivotal movement to a forward forming position, and pivotal movement to a rearward, loading and unloading position. Latch means are provided to lock the swing bar in either of the aforementioned positions. The swing bar is also rockably mounted so as to allow the forward mandrel to be rocked into the proper forming position, which is essentially vertical.

The mandrels M comprise a rigid plate 10 which is sized to snugly confine the upper ends of sleeves S and support the end panels P. Referring to FIG. 2, a circumferentially extending series of apertures 11 are formed in the mandrel plate for the purpose of preventing the formation of a vacuum during the unloading of the finished container. The plates 10 are bolted by bolts 12 to a tubular member 13. The tubular member 13 has anti-friction bearings 14 and 15 secured to its upper and lower ends, respectively. The anti-friction bearings 14 and 15 rotatably mount the tubular member 13 on a vertical shaft 16. The shaft 16 is secured at its lower end to a flanged hub 17. The flanged hub is bolted by bolts 18 to a swing bar 19.

Figure 8:
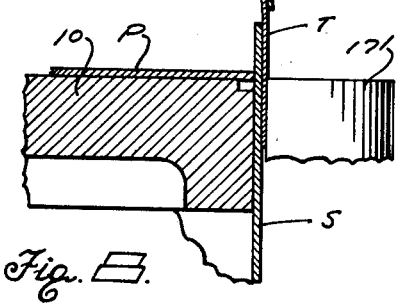
FIG. 8 is a sectional view taken along the line 8—8 of FIG. 7.

The tubular member 13 has secured thereto, at a point adjacent its lower end, a circumferentially extending series of radial arms 20. The arms 20 are sized and arranged to securely locate the lower end of the sleeve S. A circular plate 21 is located at the lower end of the arms 20 and secured to the tubular member 13. The circular plate 21 projects radially beyond the arms to provide a ledge for arresting the downward movement of the sleeve S. The distance between the mandrel plate 10 and the circular plate 21 is such that when the sleeve rests on the plate 21 and the end panel rests on the mandrel plate 10, a peripheral or marginal portion of the sleeve will extend beyond the panel. See FIG. 8. The pair of mandrels M are identical and are secured to opposite ends of the previously identified swing bar 19.

The swing bar 19 is bolted by bolts 22 to a flanged hub 23 which extends through a central aperture 24 formed in the swing bar. The flanged hub 23 carries a pair of anti-friction bearings 25 and 26 at its upper and lower ends, respectively. The anti-friction bearings 25 and 26 serve to rotatably mount the swing bar on a shaft 27. The shaft 27 is secured to the upper surface of an end block 28.

Referring to FIGS. 5 and 6, the end block 28 has secured thereto two parallel arms 29, which are secured at their opposite ends to a second end block 30. The two parallel arms 29 and the end blocks 28 and 30 form what will hereafter be referred to as a rocker arm.

The carriage of the apparatus of our invention comprises two parallel bars 31 which are secured at their ends to end blocks 32. Two pairs of wheels 33, connected by axles 34, underlie and are secured to the two parallel bars 31 by means of plates 35.

The bars 31 of the carriage have aligned bearing holes, which have journaled therein a pivot pin 36. The previously described rocker arm is placed between the parallel bars 31 of the carriage and is rockably mounted on the pivot pin 36.

The swing bar 19, which is free to pivot with respect to the rocker arm, and the carriage assembly is locked in place, relative to the rocker arm and carriage assembly, by means of a pair of dog latches 37 which are secured to opposite ends of its underside by screws 38. See FIG. 6. The dog latch 37 has a notched portion 39 which is arranged to receive a latch block 40. The latch block 40 is pivotally mounted on the pivot pin 36 and is located between the arms of the rocker arm. A foot treadle 41 is secured to the lower surface of the latch block 40. One end 42 of the foot treadle 41 is spring loaded by a compression spring 43, which urges that end of the foot treadle downwardly, thereby pivoting the latch block against the dog latch. The compression spring 43 is disposed about a guide rod 44, and has its lower end bearing against the foot treadle 41, and its upper end bearing against a stationary block 45. The stationary block 45 is secured to the bars 31 by screws 46, and also supports the upper end of the guide rod 44. Depression of the foot treadle 41 by the operator of the apparatus will allow the latch block 40 to pivot away from the dog latch 37 and allow the swing bar 19 to swing freely. Referring to FIGS. 4 and 5, a pivot arm is located adjacent the forward end of the rocker arm. The pivot arm comprises two parallel arms 47 and 48. The arms 47 and 48 are disposed between the arms 31 of the rocker arm and are secured thereto by means of a hinge pin 49 which is journaled in the arms of the rocker arm. The opposite ends of the arms 47 and 48 are secured together by means of a wrist pin 50 which rotatably mounts a roller 51. The weight of the mandrels M causes the forward end of the rocker arm to pivot upwardly. The arms of the pivot arm bear against the end block 30 of the rocker arm. The upward movement of the rocker arm is restrained by the roller 51 bearing against a beveled plate which will be described hereinafter.

The cowling 52 of the apparatus comprises no part of this invention and is merely arranged to enclose the apparatus of our invention and shield it from the elements.

*Tape Feed and Cut-Off Mechanism*

The function of the tape feed and cut-off mechanism of the apparatus is to feed out one end of a length of tape to the forming area of the apparatus and to sever the tape at the proper point in the forming cycle.

Figure 7:
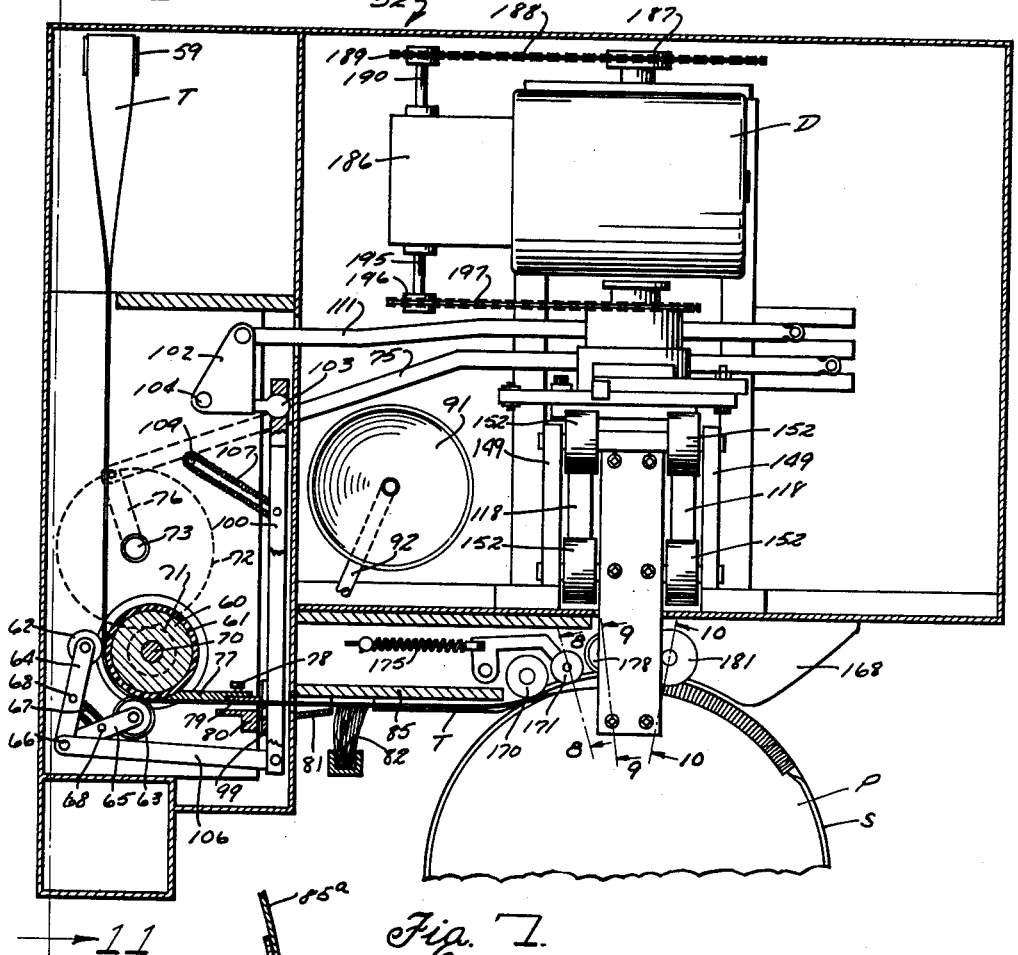
FIG. 7 is a sectional view taken along the line 7—7 of FIG. 5.
Figure 11:
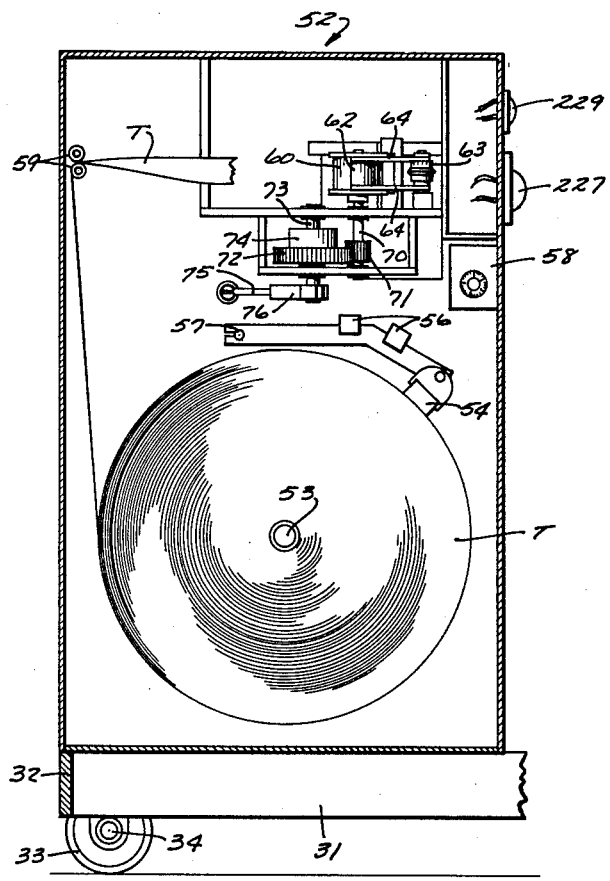
FIG. 11 is a sectional view taken along the line 11—11 of FIG. 7.

Referring to FIGS. 7 and 11, the tape feed mechanism comprises a stationary hub 53 for rotatably mounting a roll of tape T. The roll of tape T has bearing against its outer surface a block of wax or paraffin 54 which is mounted on an arm 55. The arm 55 is weighted by weights 56 and is pivotally secured to a stationary pin 57. An electrical heater 58 is also mounted in the tape compartment and serves to keep the temperature of the compartment sufficiently high to allow the wax to be applied to the tape. The wax which is supplied to the tape serves primarily as a lubricating agent between the tape and the serrated forming wheel during the forming operation.

Figure 13:
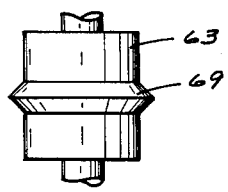
FIG. 13 is a front elevational view of the scoring roller associated with the feed roll.

The tape T after it leaves the roll is trained upwardly between two rotatably mounted rollers 59 which serve to guide the tape. The tape T after it is trained past the rollers 59 is twisted 90° to lie on edge in a vertical plane. The tape T is then trained past a feed roll 60 having a resilient, tape-engaging face 61, rubber for example. The tape T is maintained in contact with the face 61 of the feed roll 60 by means of two spring loaded rollers 62 and 63. The rollers 62 and 63 are rotatably mounted on arms 64 and 65, respectively. The arms 64 and 65 are pivotally mounted on a common, stationary pivot pin 66 and are urged together by means of a tension spring 67 which is secured at either end to their respective midsections by pins 68. Referring to FIG. 13, the second roller 63 has a circumferentially extending radial projection 69 which serves to longitudinally score the tape as it passes between the roller 63 and the feed roll 60. This longitudinal scoring of the tape increases its resistance to buckling. Buckling of the tape occurs when the free end of the tape is pushed past the bristles of the wetting brush, which will be described hereinafter.

The feed roll 60 is secured to a depending shaft 70 which has pinned thereto, at its lower end, a pinion gear 71. The pinion gear 71 runs in mesh with a spur gear 72. The spur gear 72 is connected to a shaft 73 through a conventional cam-type ratchet 74. The shaft 73 extends downwardly from the spur gear 72 and is secured to an arm 75 by means of a lever 76 which is affixed to the shaft 73. On forward movement of the arm 75 the cam ratchet 74 allows free rotational movement of the shaft 73; and on backward movement of the arm 75, the cam ratchet engages to rotate the spur gear 72. Rotation of the spur gear 72 rotates the pinion gear 71 and the feed roll 60, thereby feeding out a length of tape. The length of tape fed out may be adjusted by adjusting the length of the lever 76.

The tape T, after it is trained around the feed roll 60, proceeds past a guide surface 77 which has secured thereto by means of a screw 78 a shear block 79. Adjacent the path of the tape and oppositely disposed to the shear block 79 is a second guide member 80. Proceeding past the shear block 79, the tape exits the apparatus through an aperture formed in the cowling 52, and enters a funnel-like chute 81. From the chute 81 the tape proceeds past the brush means for wetting the tape.

Referring to FIG. 17, the brush means for wetting the tape comprises a bristle brush 82 held in brush holder 83 by screws 84. The brush holder 83 is arranged to hold the brush so that its bristles slope downwardly at an angle of approximately 10° from the horizontal. The ends of the bristles are cut back so that they form a surface which is parallel with the path of the tape T. The path taken by the tape extends between the ends of the bristles and a stationary backing plate 85, which is secured to the cowling by horizontal supports 86. The brush holder 83 is carried by an arm 87 which is pivotally connected by a wrist pin 88 to a stationary arm 89. The stationary arm 89 is secured by screws 90 to the cowling. The pivotal point provided by the wrist pin 88 is spaced forwardly of the brush 82, thereby allowing the weight of the brush holder and its associated arm 87 to cause the ends of the bristles to bear resiliently against the adhesively coated surface of the tape. A wetting agent, such as water, is confined in a reservoir 91, and is conveyed through a conduit 92, having a conventional cut-off valve 93, to a conventional metering valve 94. The metering valve 94 has an adjustment screw 95 for varying the rate of flow from an orifice 96. The orifice 96 is positioned above the bristles of the brush. The wetting agent is dripped or flowed onto the bristles of the brush and, because of the downward slope of the bristles, the wetting agent flows down the bristles onto the tape, thereby wetting it.

Figure 14:
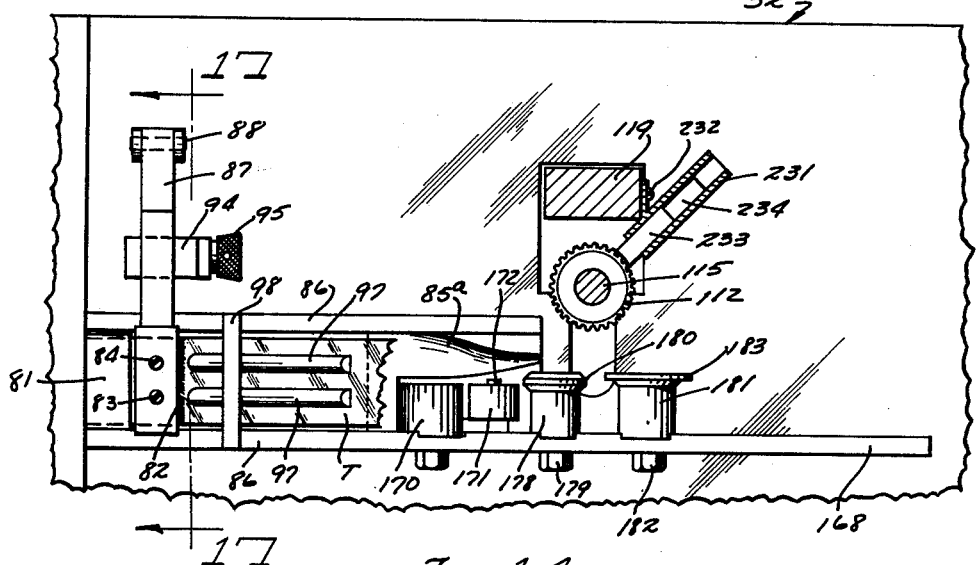
FIG. 14 is a partial front elevational view showing the forming area of the container forming apparatus.

Referring to FIG. 14, after proceeding past the brush 82 the tape passes along the vertical guide surface 85 and is held in alignment therewith by means of two stationary parallel guide fingers 97 which are secured to the horizontal supports 86 by a vertical bar 98.

Referring to FIGS. 7, 11 and 19, the tape cut-off means comprises a knife edge 99 mounted on a carrier comprising two spaced apart, parallel arms 100 having a central spacing member 101. Referring to FIG. 7, the carrier is disposed adjacent the shear block 79 and transversely to the path of the tape T. The arms 100 are pivotally connected at one end to a bell crank member 102 at point 103. The bell crank member 102 is pivotally connected to a stationary pivot pin 104. The other ends of the arms 100 are pivotally connected by a wrist pin 105 to a second pair of spaced apart, parallel arms 106. The arms 106 are pivotally connected at their opposite ends to the previously referred to stationary pivot pin 66. The arms 100 are spring loaded by means of a pair of tension springs 107, to thereby urge the knife edge 99 past the shear block 79. The springs 84 are secured at one end to notched extensions 108 mounted on the arms 100, and secured at their opposite ends to a stationary stud 109. The relative arrangement of the stationary pivot pins 66 and 104 is such that the knife edge 99 will wipe across the shear block 79 to sever the tape on rotation of the bell crank member 102. The knife edge 99 is provided with a V-shaped shearing surface 110 to facilitate the severance of the tape. The bell crank member 102 is pivotally connected to and rockable by an arm 111. The operation of this arm 111 will be described later.

*Forming Means*

Briefly, the main elements of the forming means comprise a plurality of rotatable rollers which are arranged to radially press the tape against the sleeve to adhere it thereto, and inwardly fold the adhered tape and sleeve on rotation of the sleeve; and a rotary serrated forming wheel which is lowered downwardly to axially compress the inwardly folded portions and end panel together into an annular series of radial undulations conforming to the serrations of the wheel.

Referring particularly to FIG. 29, the serrated forming wheel 112, which is mounted on a drive shaft 115, comprises a slightly conical cylinder having a major diameter end 112a and a minor diameter end 112b. The forming wheel has an annular series of serrations cut therein which form a plurality of teeth 113. The teeth, which are of greater depth at the minor diameter end of the wheel, are provided with flats 114 on their outer peripheral surfaces. The purpose of the flats is to prevent breaking or rupturing the tape as it is pressed into place. The forming wheel is placed on the drive shaft so that its major diameter end 112a will contact the inner peripheral edges of the infolded portions of the sleeve and tape. See FIG. 12. With the forming wheel thus positioned and with the axis of the forming wheel and the axis of the mandrel substantially normal, the aforementioned inner peripheral edges will be compressed into undulations of greater extent than the remainder of the infolded portions. Undulations of greater extent, that is, of greater depth or frequency are preferably at the inner peripheral edges because there is more excess material to be compressed into place than at the perimeter of the container. It may be mentioned at this point that since the end panel is positively engaged by the teeth of forming wheel and since the mandrel is freely rotatable, the mandrel and hence the sleeve and end panel will rotate on rotation of the forming wheel.

Figure 12:
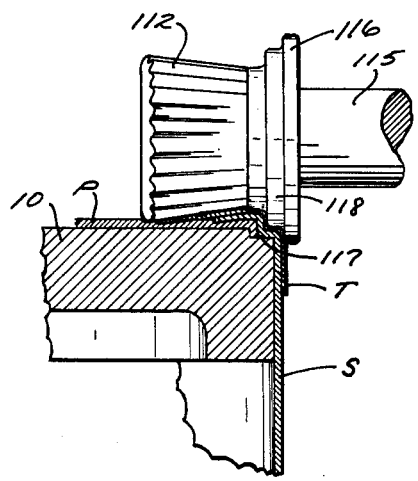
FIG. 12 is a side elevational view taken along the axis of the serrated wheel with the mandrel and container shown in section.
Figure 10:
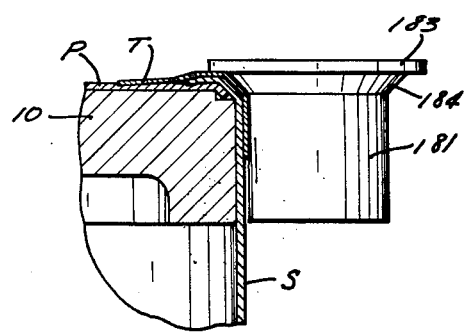
FIG. 10 is a sectional view taken along the line 10—10 of FIG. 7.

Referring to FIG. 29, a stepped forming wheel 116 is disposed in abutting relationship with the rear surface of the forming wheel 112 and is affixed to the drive shaft 115. Referring to FIG. 12, when the drive shaft 115 is lowered into the forming position the stepped wheel provides axial pressure along the perimeter of the mandrel plate 10, thereby downwardly pressing the sleeve and tape. The mandrel plate 10 is provided with an annular, peripheral notch 117 into which the intermediate step 118 of the stepped wheel presses the tape and sleeve. As will be seen from FIG. 10, the tape and sleeve will spring outwardly to a minor degree after it is released from the influence of the stepped wheel. The purpose of the stepped wheel is to permanently deform the sleeve, thereby eliminating its tendency to spring upwardly to its former upright position.

Referring to FIGS. 18 and 28, the drive shaft 115 which supports and rotates the forming wheel 112 has its intermediate portion journaled in bearing blocks 117. The bearing blocks position the drive shaft so that its axis of rotation is substantially normal to and in line with the axis of the mandrel when the mandrel is in the forming position. The bearing blocks 117 are supported and carried by two parallel, spaced apart vertical rails 118. A supporting member 119 is secured between the vertical rails 118 and extends over the forming wheel 112. A depending bearing block 120 is secured to the outer end of the supporting member 119. The bearing block 120 has journaled therein the outer end of the drive shaft 115. See FIG. 29. At the opposite end of the drive shaft 115 is a sprocket 121. The sprocket 121 is mounted for free rotational movement on the drive shaft and is maintained in place by a collar 122 which is pinned to the shaft 115.

Referring now to FIGS. 25–28, a clutch housing 123 is spaced between the sprocket 121 and the bearing block 117, and is keyed to the drive shaft 115 by a key 124. The clutch housing has a circumferentially extending groove 125, which traverses a longitudinal extending bore 126. The bore 126 houses a cam-engaging pin 127 which is spring loaded by means of a spring 128. The pin 127 has a transversely extending notch 129. The notch 129 has an angular cam surface 130. The sprocket 121 has a cavity 131 adjacent the clutch housing 123. Located in the cavity 131 are two longitudinally extending studs 132 which are radially spaced from the axis of rotation to coincide with the center line of the clutch pin 127. The studs 132 are retained in apertures 133 formed in the sprocket 121. A cam latch 134 having a pin engaging surface 135 is arranged to ride in the annular groove 125.

Referring to FIG. 25, the cam latch 134 is pivotally mounted on the stationary pivot pin 136 which is secured by a bracket member 137 to the vertical rails 118. The cam latch 134 is spring loaded and urged into a downward position by a compression spring 138. The compression spring 138 is disposed about a guide rod 139 and bears at one end against a block 140 secured to the bearing block 117. The compression spring 138, at its other end, bears against a block 141 which mounts the guide rod, and which is pivotally secured by a pin 142 to the outer end of the cam latch 134. At the opposite end of the cam latch is pivotally mounted a brake arm 143 by a pin 144. The brake arm 143 is spring loaded by a spring 145, and thereby urged downwardly. The compression spring 145 bears against a pocket 146 formed in the brake arm and against a stationary block 147 which is secured to the cam latch 134, whereby the brake arm is urged downwardly relative to the cam latch. At the opposite end of the brake arm 143 is a brake shoe 148 which is arranged to bear against the clutch housing 123. When the cam latch rides in the annular groove, and the clutch housing is rotated, the cam surface 135 of the cam latch will engage the angular cam surface 130 of the pin, thereby urging the clutch pin backwardly out of engagement with the studs 132 carried by the sprocket. When the cam latch 134 does not ride in the annular groove, the spring 128 urges the cam pin 127 into the cavity 131 of the sprocket, where it is engaged by one of the studs 132, to thereby engage the clutch. It also may be mentioned that the brake shoe 148 has a limited amount of relative movement which permits it to depend below the cam latch, thereby allowing it to engage the clutch housing before the cam latch sets in the annular groove 125.

Referring now to FIGS. 4, 5 and 18, the bearing blocks 117 for supporting the forming wheel, drive shaft, and the clutch and brake assembly, are secured to two vertical rails 118. Referring to FIG. 4, the vertical rails 118 are positioned for vertical movement between two parallel, upstanding, stationary guide rails 149. The guide rails 149 are bolted by bolts 150 to the bars 31 of the carriage assembly. See FIG. 1. Four pairs of anti-friction rollers 151 are rotatably mounted on transverse edges of the vertical rails 118. The anti-friction rollers 151 are arranged to guide the vertical rails between the stationary rails 149. Three pairs of rollers 152, rotatably mounted on shafts 153, are secured to the stationary guide rails 149 to keep the vertical rails vertically aligned and prevent them from moving transversely. The rollers 152 and the anti-friction rollers 151 cooperate to keep the vertical rails 118 in vertical alignment and allow them to move freely upward and down.

A cam follower comprising a roller 154 is rotatably mounted on a block assembly 155. The block assembly 155 is affixed to the vertical rails 118, thereby positioning the roller 154 between the vertical rails. The vertical rails 118 are spring loaded by means of a pair of compression springs 156 which urge the roller 154 upwardly against a first cam, which will be described hereinafter. The springs 156 are disposed about guide rods 157 and bear against, at their upper ends, a block 157a which is secured to the vertical rails 118 and support the guide rod. The springs 156, at their lower ends, bear against a block 158 which is secured to the stationary rails 149.

A second roller 159 is rotatably mounted at the lowermost end of the vertical rails 118. Referring to FIG. 5, the second roller 159 bears against one beveled edge 160 of a beveled plate 161. The beveled plate 161, which serves as an operative link between the vertical rails and the pivot arm 48, is spring loaded by means of a compression spring 162 to keep the beveled edge 160 in contact with the second roller 159. The compression spring 162 is disposed about a guide pin 163. The compression spring 162, at one end thereof, bears against a block 164 which is pivotally connected to the plate 161. The other end of the spring 162 bears against a stationary plate 165. The plate 161 has two spaced apart, parallel edges 166 which are guided by stationary, rotatably mounted rollers 167. Oppositely disposed from the first mentioned beveled edge 160 is a second beveled edge 168 which bears against the roller 51 carried by the pivot arm 48.

Downward movement of the vertical rails 118 will cause the second roller 159 to bear against the beveled plate 161. The beveled plate 161 will move between the stationary rollers 167, thereby downwardly displacing the roller 51 carried by the pivot arm 48. The pivot arm 48 bears against the end block 30 of the rocker arm, thereby pivoting the rocker arm about the pivot pin 36 causing the forward mandrel to rock to a vertical, forming position. Continued downward movement of the vertical rails, after the mandrel has reached the forming position, is made possible by the fact that the roller 51 carried by the pivot arm 48 will be displaced from the stationary roller 167 by a distance no greater than the width of the beveled plate 161.

Figure 15:
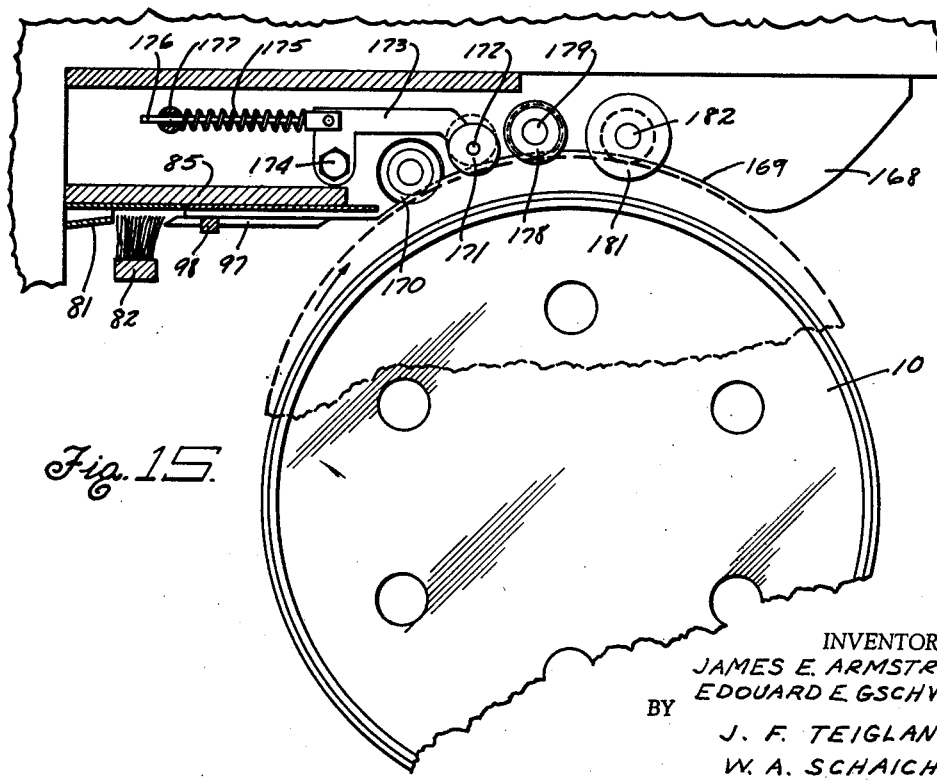
FIG. 15 is a partial sectional view taken along the line 15—15 of FIG. 1.

Referring to FIGS. 14 and 15, as the tape T is fed out tangentially to the upper marginal portion of the sleeve it is engaged and acted upon by four rotatably mounted rollers. The first two rollers which contact the tape apply radial pressure to the tape and sleeve, thereby adhering the wetted tape to the sleeve in a position overlying the marginal portion of the sleeve and also extending below the marginal portion onto the side wall of the sleeve and also axially beyond the end of the sleeve. The four rollers are mounted on a shelf 168 which is an extension of the lower horizontal support 86. The shelf 168 has an arcuate cut-back portion 169 which is shaped to generally conform to the perimeter of the sleeve. The forming rollers are arranged to overhang the shelf so as to tangentially contact and arrest the movement of the sleeve and mandrel prior to the sleeve contacting the shelf.

The first and second rollers 170 and 171, respectively, are cylindrical in shape and are arranged to press the tape against the sleeve. See FIG. 8. The first roller 170 is rotatably mounted on a stationary pivot pin, which is secured to the shelf 168. The second roller 171 is rotatably mounted on a pin 172 carried by an arm member 173. The arm member 173 is pivotally mounted by a stationary pivot pin 174 and is spring loaded by a compression spring 175 so as to be urged outwardly. The compression spring 175 is disposed about a guide rod 176 and bears against a stationary slotted pin 177 and against a carrier arm 173. In this manner, the second roller is mounted so as to extend out beyond the remainder of the rollers, thereby being the first to press the tape against the sleeve.

Figure 9:
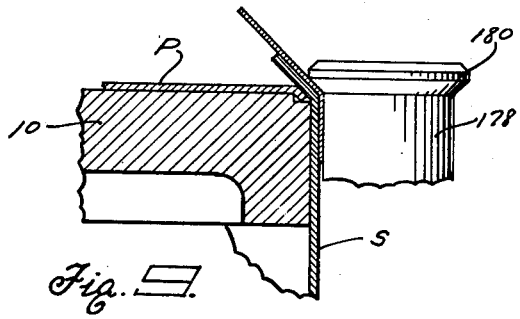
FIG. 9 is a sectional view taken along the line 9—9 of FIG. 7.

The third roller 178 is rotatably mounted on a pin 179 and has a circumferentially extending radial projection 180 which is arranged to contact and inwardly fold the adhered tape and the upper marginal portion of the sleeve. See FIG. 9. The axially extended portion of the tape is also inwardly folded by the curved surface 85a which is a continuation of the backing plate 85. See FIG. 14. The fourth roller 181 is rotatably mounted on a stationary pin 182 and has at its upper end a radially outwardly extending ledge 183 which is adapted to closely overlie the inwardly folded portions of the tape and sleeve. See FIG. 10. The ledge 183 is connected to the main cylindrical body portion by a downwardly and sloping surface 184 which is arranged to contact the outer peripheral portion of the end of the container.

The purpose of the third roller 178 is to inwardly fold a portion of the sleeve and tape, on rotation of the sleeve, and is placed before the serrated forming wheel, so that the aforementioned infolded portions are in a proper position to be acted upon by the forming wheel. The fourth roller serves to apply axial and radial pressure to the tape and inwardly folded portions just subsequent to their being acted upon by the forming wheel. The axial pressure provided by the fourth roller is sufficient to maintain the inwardly folded portions of the tape in their proper positions until the inner peripheral portion of the tape has adhered to the end panel P.

*Control Means*

Referring to FIGS. 5 and 7, a drive motor D, mounted on a stationary platform 185, serves to provide power to rotate the serrated forming wheel 112 and also rotates a cam shaft, which carries a series of cams that control the sequence of the forming operation. The drive motor D drives a first speed reducer 186 through a sprocket 187 secured to its output shaft and a chain 188, which connects the sprocket 187 to a sprocket 189 that is secured to the input shaft 190 of the first speed reducer 186. The chain 188 is also trained around a sprocket 191 which is secured to the input shaft of a second speed reducer 192. The second speed reducer 192 is bolted by bolts 193 to a stationary mounting platform 194 and is located directly below the drive motor D.

The output shaft 195 of the first speed reducer 186 has affixed thereto a sprocket 196. A chain 197 is trained around the sprocket 196 and around the previously referred to sprocket 121 that is mounted on the drive shaft 115.

Referring to FIG. 5, the second speed reducer 192 has an output shaft 198, which will be referred to as the cam shaft, and has its outer end journaled in a bearing block 199 that is secured to the cowling 52. Keyed to the cam shaft is a series of five cams which sequentially control the various mechanisms of the apparatus of our invention. Referring to FIG. 5 and reading from left to right, they comprise a first cam 200 which actuates the vertical rails to lower and raise the forming wheel, a second cam 201 which actuates the clutch and brake assembly, a third cam 202 which actuates the tape feed mechanism, a fourth cam 203 which actuates the tape cut-off mechanism, and a fifth cam 204 which operates a microswitch.

Referring to FIGS. 5 and 18, the first cam 200 bears against the roller 154 carried by the vertical rails 118. On rotation of the first cam 200 the vertical rails 118 will be urged downwardly thereby lowering the serrated forming wheel into the proper forming position and also rocking the forward mandrel into an upright position, in the manner previously described.

Referring to FIG. 21, the second cam 201 bears against a cam following roller 205. The cam following roller 205 is rotatably mounted on an arm 206 which is pivotally connected at its lower end to one of the stationary guide rails 149 by a pin 207. The other end of the arm 206 is pivotally connected by a pin 208 to the lower end of an upstanding lever 209. The upstanding lever 209 carries at its upper end a roller 210 which rolls along the surface of the other of the stationary guide rails 149. At the uppermost end of a lever 209 is a bumper 211 which is arranged to engage the cam latch 134. On rotation of the cam shaft 198 and the first cam 200 the vertical rails will lower the clutch assembly, thereby closing the distance between the bumper 211 and the cam latch 134. At the proper instance the cam 201 will cause the bumper 211 to move quickly, upwardly to knock the cam latch away from the spring loaded cam pin 127, thereby engaging the clutch and causing the serrated forming wheel to rotate.

Referring to FIG. 20, the third cam 202 engages a cam following roller 212 carried by a lever 213. The lower end of the lever 213 is pivotally connected by a pin 214 to a stationary block 215 that is secured to one of the stationary rails 149. The lever 213 is spring loaded, so as to keep the cam following roller 212 bearing against the cam 202 by means of a compression spring 216 which is disposed about a guide rod 217. The upper end of the spring 216 bears against an arm 218 that is secured to one of the stationary guide rails 149 and also supports the upper end of the guide rod 217. The lower end of the spring 216 bears against a stationary support 219 and is secured to one of the stationary guide rails 149. The upper end of the lever 213 is pivotally connected by a pin 220 to the previously referred to arm 75. The arm 75, as previously described, operates the feed mechanism which is partially shown in schematic form in FIG. 20. On rotation of the cam 202 the arm 75 will be moved forwardly and backwardly, thereby feeding out a length of tape.

Referring to FIG. 22, the fourth cam 203 bears against a lever 221. The lever 221 is pivotally connected at its lower end by a pin 222 to a stationary member 223 that is secured to one of the stationary guide rails 149. The upper end of the lever 221 is pivotally connected by a pin 224 to the previously referred to arm 111. The arm 111, as previously described, is pivotally connected to the bell crank member 102 and operates the tape cut-off mechanism which is schematically shown, in part, in FIG. 22. On rotation of the cam 203 the arm 111 will be moved forwardly and backwardly at the proper place in the forming cycle, thereby rocking the bell crank member 102 and severing the tape.

Referring to FIG. 23, the fifth cam 204 operates a microswitch 225 which is connected into the electrical circuitry of the apparatus. A sixty cycle line source is provided at 226. Connected across the line source is an on-off line 227 and two electrical resistance-type heaters 58 (see FIG. 11) and 228. The electrical resistance heaters are conventional and are provided with thermostats. As previously described, one of the heaters 58 is placed in the tape compartment and the other heater 228 (not shown on the drawings) is placed adjacent to the reservoir 91 to keep the wetting agent at the proper temperature. Also connected across the line source is the drive motor D. A manually operated switch 229 and the microswitch 225 are disposed in the line to break the source of power in the drive motor. Manual closing of the switch 229 by the operator of the apparatus will engage the drive motor, thereby rotating the cam 204 and closing the microswitch 225. At the end of the forming cycle the cam 204 will allow the microswitch 225 to open, thereby cutting off power to the drive motor and stopping the operation of the apparatus. A conventional on-off line switch is also provided at 230.

*Operation*

In operation, the paperboard sleeve S is placed on one of the mandrels M and allowed to come to rest on the circular plate 21 so as to leave an upper marginal portion of the sleeve extending above the mandrel plate 10. The end panel P is placed within the sleeve and allowed to rest on the mandrel plate.

The mandrel is then swung into the forward position with the dog latch 37 engaging the latch block 40 to securely hold the mandrel in the forward position.

The manaully operated switch 229 is closed to energive the drive motor D and start the forming cycle. The drive motor, when energized and operating through the second speed reducer 192, starts the cam shaft 198 (which is the output shaft of the second speed reducer) rotating. On rotation of the cam shaft, the fifth cam 204 operates the microswitch 225 to keep the motor D energized until the forming cycle is completed, which occurs in one revolution of the cam shaft.

The first cam 200 contacts the cam roller 154 carried by the vertical rails 118 which support and carry the forming wheel 112 and brake and clutch assembly. The first cam begins to lower the vertical rails 118 and hence the forming wheel 112. At this point in the forming cycle the mandrel carrying the paperboard sleeve and panel is tilted backwardly and does not have a peripheral portion directly below the forming wheel.

As the vertical rails are moved downwardly by the first cam, the lowermost roller 159 carried by the vertical rails bears against the spring loader beveled plate 161, thereby pushing the beveled plate backwardly. Backward movement of the beveled plate causes its rearmost end to move downwardly under the influence of the stationary roller 167, thereby downwardly pivoting the pivot arm 48. The arm bears against the end block 30 of the rocker arm, causing the rocker arm to pivot, thereby carrying the forward mandrel M to a vertical position with a peripheral portion directly below the forming wheel. As the mandrel is pivoted forwardly the upper marginal portion of the sleeve is contacted by and bent over by the forming rollers 178 and 181. The tape T fed out by the previous forming cycle is caught between the sleeve and forming rollers 170 and 171 and is pressed against the sleeve. When the mandrel is in the proper upright position the forming wheel has not yet reached its lowermost, forming position. Further downward movement of the vertical rails 118 and hence the forming wheel, without further pivoting the mandrel, is made possible by the fact that the beveled plate 161 becomes tilted downwardly, whereby one of the stationary rollers 167 and the arm 48 become disposed across the width of the beveled plate, their maximum relative displacement. Accordingly, the forming wheel is lowered until it comes into contact with the end panel P and sleeve S at which point the first cam 200 does not urge the vertical rails downwardly anymore.

At the instant the forming wheel reaches its lowermost position, the clutch is engaged and the brake is released. To regress, when the drive motor D is energized to drive the second speed reducer, it also rotates the sprocket carried by the forming wheel shaft. At the beginning of the forming cycle, the clutch is disengaged and the sprocket rides freely on the forming wheel shaft. The brake and clutch assembly are carried by the vertical rails and move downwardly with the forming wheel. The cam latch 134 is also carried by the vertical rails and is spring loaded to normally urge it into a position to keep the clutch disengaged. The brake arm is carried by the cam latch and is spring loaded to normally bear against the clutch housing. At the instant the forming wheel reaches its lowermost position, the bumper arm 209 is moved upwardly by the second cam 201 to move the cam latch and brake shoe 148 upwardly, thereby allowing the clutch to become engaged. On engagement of the clutch the forming wheel starts rotating.

The rotating forming wheel concurrently compresses and deforms the infolded portions of the sleeve and tape, and the end panel, and rotates the mandrel thereby forming the infolded portions and end panel into an annular series of radial undulations. The formation of the undulations results in the excess tape and sleeve that exist at their respective inner peripheral edges being depressed into the end panel instead of overlapping to create minute channels that prevent the formation of a liquid-tight container.

Referring to FIG. 14, a block of wax or paraffin 233 is allowed to resiliently bear against the serrated forming wheel. The wax picked up by the forming wheel acts as a lubricant between the wheel and the tape. The block of wax 233 is supported in a holder 231 which is secured to the supporting member 119 by a screw 232. A weight 234 is placed behind the wax to urge it against the forming wheel.

The rotating forming wheel 112 bearing against the peripheral edge of the mandrel M causes the mandrel to rotate about its central axis. As the mandrel rotates the already adhered tape causes the tape to keep feeding out. When the proper length of tape has been fed out, which is a length slightly greater than the circumference of the container, the knife edge is operated by the fourth cam 203. The bell crank member 102 is pivoted by the fourth cam to quickly wipe the shear across the cutting block to sever the tape while it is in motion.

After the tape has been severed the forming wheel keeps on rotating until the mandrel has revolved 2½ times. The additional 1½ revolutions insures that the tape is properly secured or bonded in place.

At the end of the 2½ revolutions of the mandrel, the first cam 200 starts to raise the vertical rails, thereby raising the forming wheel 112 and rocking the mandrel backwardly in the reverse order of that described for the beginning of the cycle.

Also, as the vertical rails move upwardly, the bumper arm 209 is lower, thereby allowing the brake shoe and cam latch to contact the clutch housing. The brake shoe contacts the housing first and creates a drag. The cam latch next settles in the circumferentially extending groove 125, provided in the housing, and drives the spring loaded pin 127 backwardly to disengage the clutch. The clutch housing and hence the forming wheel are then brought to a stop because of the drag imposed by the brake shoe.

After the mandrel has moved backwardly away from the forming rollers, the tape feed mechanism is actuated by the third cam 202. The spur gear 72 of the tape feed mechanism moves forward freely because of the cam ratchet 74 and on the back stroke moves the feed roll 60 the number of revolutions necessary to feed the tape out to a point opposite one or more of the forming rollers. As the tape is fed out by the feed roll, one of the spring loaded rollers 63 which holds the tape against the feed roll longitudinally scores the tape to increase its longitudinal resistance to buckling. Buckling is sometimes occasioned by the resistance provided by the wetting brush. The tape as fed out is in position for the next forming cycle.

Immediately after the tape has been fed out for the next cycle, the fifth cam 204 allows the microswitch to open, thereby cutting off the power to the drive motor. The operator then depresses the foot treadle 41 to release the dog latch 37 and swings the mandrel M carrying the completed container to a rearward position, thereby swinging an unformed sleeve and end panel which have been placed on the other mandrel into a forward position for the next forming cycle.

Referring to FIGS. 32 and 33, in the preferred form of the completed container the infolded portions of the sleeve and tape, and the end panel are compressed together into an annular series of undulations, thereby placing the members into substantially continuous face-to-face contact. As will be noted from the sectional view, FIG. 33, the inner peripheral portion of the tape is preferably depressed into the end panel to provide a positive liquid-tight seal. In the preferred container, a marginal portion of the tape is also allowed to extend beyond the infolded portion of the sleeve onto the side wall of the sleeve, thereby providing a positive liquid-tight seal along this marginal portion of the tape.

Where desired, the tape T can be omitted and the end panel and the marginal portion of the sleeve can be secured or bonded together by means of an adhesive deposited therebetween. The container of this type is formed on the apparatus previously described with the exception that no tape is supplied to the forming area. After a sleeve and end panel have been placed on the mandrel, a conventional, quick-setting liquid adhesive can be manually brushed onto the inner surface of the axially extending marginal portion of the sleeve. The apparatus is then operated in the manner previously described. The container thus formed will have the infolded portion of the sleeve and the end panel compressed and bonded together into an annular series of radial undulations which place them into substantially continuous face-to-face contact to provide a liquid-tight seal.

It will, of course, be understood that various details of construction may be modified through a wide range without departing from the principles of this invention, and it is not, therefore, the purpose to limit the patent granted hereon otherwise than necessitated by the scope of the appended claims.

We claim:

1. The method of combining a deformable sleeve having a side wall defining at least one open end, a panel adapted to fit within said sleeve, and a length of tape into a liquid-tight container, which comprises, supporting said sleeve, positioning said panel within said sleeve with said panel being adjacent but spaced inwardly from said open end, thereby leaving a marginal portion of said sleeve extending beyond said panel, adhering said tape to said sleeve, with a portion of said tape overlying said marginal portion and another portion of said tape extending axially beyond said end of said sleeve, inwardly folding said marginal portion, whereby said marginal portion and said tape overlie said panel, compressing said marginal portion, tape, and panel into an annular series of undulations whereby said marginal portion, tape, and panel are disposed in face-to-face contact.

2. The method of combining a circular deformable sleeve having a continuous side wall defining at least one open end, a deformable panel adapted to fit within said sleeve, and a length of tape into a liquid-tight container, which comprises, supporting said sleeve, positioning said panel within said sleeve with said panel being adjacent but spaced inwardly from said open end, thereby leaving a marginal portion of said sleeve extending beyond said panel, adhering said tape to said sleeve with a portion of said tape overlying said marginal portion and another portion of said tape extending axially beyond said end of said sleeve, inwardly folding said marginal portion, whereby said marginal portion and tape overlap said panel, rigidly supporting said panel, and rolling a serrated wheel across the area of overlap to compress said marginal portion, tape, and panel into a series of undulations, whereby said marginal portion, tape, and panel are disposed in face-to-face contact.

3. The method of combining a circular, deformable sleeve having a continuous side wall defining an open end, a deformable panel adapted to fit within said sleeve, and a length of tape into a liquid-tight container, which comprises, supporting said sleeve for rotational movement about its central axis, positioning said panel within said sleeve with said panel being adjacent but spaced inwardly from said open end, thereby leaving a marginal portion of said sleeve extending axially beyond said panel, adhering said tape to said sleeve with a portion of said tape overlying said marginal portion and another portion of said tape extending axially beyond said end of said sleeve, inwardly folding said marginal portion, whereby said marginal portion and tape overlap said panel, rigidly supporting said panel, bringing a serrated wheel mounted for rotational movement about a stationary axis into contact with the inwardly folded portions of said tape, thereby compressing said marginal portion, tape, and panel together in the area of contact, and rotating said wheel, to cause said sleeve to rotate about its central axis to create a series of undulations in the area of overlap, thereby compressing said marginal portion, tape, and panel into continuous face-to-face relationship.

4. The method of claim 3, wherein said sleeve and panel are formed of paperboard.

5. The method of claim 3, wherein said serrated wheel is adapted to provide undulations of greater extent at the inner peripheral edges of said undulations.

6. The method of claim 3, wherein said stationary axis is positioned substantially normal to the central axis of the sleeve.

7. In the method of forming a circular drum-type container having a continuous side wall with a portion inwardly folded to form a ledge, and a panel disposed interiorly of said container and abutting said ledge, the step which comprises, compressing said ledge and panel together to form an annular series of radial undulations, thereby providing a liquid-tight seam between the ledge and panel.

8. In the method of forming a circular drum-type container having a side wall with a portion inwardly folded to form a ledge, a panel disposed interiorly of said container and abutting said ledge, and a length of tape covering the juncture of said panel and ledge, the step which comprises, compressing said ledge, tape, and panel together to form an annular series of radial undulations, thereby providing a liquid-tight seam between the ledge, tape, and panel.

9. The method of combining a circular, deformable sleeve having a continuous side wall defining an open end, a deformable panel adapted to fit within said sleeve, and a length of tape into a liquid-tight container, which comprises, supporting said sleeve for rotational movement about its central axis, positioning said panel within said sleeve with said panel being adjacent but spaced inwardly from said open end, thereby leaving a marginal portion of said sleeve extending beyond said panel, adhering said tape to said sleeve to cover said marginal portion and extend axially inwardly and outwardly beyond said marginal portion, inwardly folding said marginal portion, whereby said marginal portion and a portion of said tape overlap said panel, rigidly supporting said panel, bringing a serrated wheel mounted for rotational movement about a stationary axis into contact with the overlapping portion of said tape, thereby compressing said marginal portion, tape, and panel together in the area of contact, and rotating said wheel, to cause said sleeve to rotate about its central axis and create an annular series of undulations in the area of overlap, thereby compressing said marginal portion, tape, and panel into substantially continuous face-to-face relationship.

10. The method of producing a paperboard drum composed of a sleeve-like body, an end panel, and an adhesive tape securing the body and panel together to form a liquid-tight seal therebetween, which comprises, supporting the body for rotation about its axis, positioning the end panel within and spaced a short distance from an end of the body, bonding an end of a length of tape to the body axially outward of said panel and with a marginal portion of the tape extending beyond said end of the body, applying radial inward pressure to the tape and concurrently rotating the body about its axis, thereby to form and attach an axially extended collar of tape to the body, folding the tape and contiguous portions of the body inwardly into engagement with peripheral portions of the panel and applying deforming pressure axially to the inwardly folded portions to form an annular series of radial serrations or undulations and press the tape into firm engagement with the end panel.

11. The method of producing a container composed of a deformable sleeve-like body, a deformable end panel, and an adhesive tape securing the panel and body together to form a liquid-tight seal therebetween, which comprises, supporting the body for rotation about its axis, supporting and positioning an end panel within and spaced from an end of the body, thereby leaving a marginal portion of the body extending beyond the panel, positioning one end of the length of tape in a position proximate said marginal portion, applying radial pressure to adhere the tape to the body and concurrently rotating the body to thereby form and attach an axially extended collar of tape to the body, applying radially deforming pressure to said marginal portion and concurrently rotating the body to inwardly fold said marginal portion and the tape adhered thereto to overlie said end panel, and applying axial deforming pressure to the inwardly folded portions to form an annular series of radial serrations or undulations and press the axially extended tape into firm engagement with the end panel.

12. The method of uniting a deformable sleeve-like body and an end panel to produce a liquid-tight container, the steps which consist in supporting the panel within and near an end of the body, thereby leaving a portion of the body extending beyond the panel, adhering a length of tape to the exterior of the extended body portion with a marginal portion of the tape extended beyond the body, bending both said extended body portions and at least a part of the adhered tape radially inwardly over the margins of the panel, bonding the tape to said panel and compressing at least portions of the tape and subjacent areas of the panel into an annular series of undulations.

13. The method of uniting a deformable sleeve-like body and an end panel to produce a liquid-tight container, the steps which comprise, supporting the panel within and near an end of the body, thereby leaving a portion of the body extending beyond the panel, adhering a length of tape to the exterior of the extended body portion with a marginal portion of the tape extended beyond the body, bending both said extended body portions and at least a part of the adhered tape radially inwardly over the margins of the panel, applying pressure progressively along the inwardly bent portion of the tape to concurrently bond the tape and panel together and produce an annular series of radial undulations in the tape and subjacent parts of the body portion.

14. The method of forming a drum comprising a sleeve having at least one open end, an end panel fitted within said open end, and a length of adhesive carrying tape bonding the sleeve and panel together which comprises, supporting said sleeve with the panel positioned interiorly thereof adjacent said open end, bringing one end of said tape to a position proximate said sleeve, bonding one marginal edge portion only of said tape into liquid-tight contact with said sleeve leaving a portion of said tape extending beyond said open end of the sleeve and circumferentially of the latter, inwardly folding said extended portion of the tape to overlie said panel, and crimping said folded portion and panel into liquid-tight contact.

15. The method as defined in claim 14, wherein said crimping step includes rolling a serrated forming wheel across said portion of tape to crimp said tape and panel into continuous face-to-face contact.

16. The method defined in claim 14, wherein the sleeve is rotated about its axis relative to crimping means to crimp the folded portion and panel.

17. Apparatus for assembling a deformable sleeve having at least one open end, a deformable end panel within an end of said sleeve, and a length of tape to provide a liquid-tight drum, comprising means for supporting said sleeve with the panel positioned interiorly of said sleeve adjacent said open end, means for supplying a predetermined length of said tape to a position proximate said sleeve, and forming means for applying said tape to said sleeve and panel, with one marginal edge of said tape in liquid-tight contact with said sleeve and the other marginal edge of said tape inwardly folded into liquid-tight contact with said panel.

18. Apparatus as defined in claim 17, wherein said forming means includes a forming wheel having an annular series of serrations adapted to selectively crimp said other marginal edge and panel into liquid-tight contact.

19. Apparatus for assembling a circular, deformable sleeve having a continuous side wall defining an open end, a deformable end panel within one end of said sleeve, and a length of tape to provide a liquid-tight container, comprising means for supporting said sleeve for rotational movement about its axis with said panel disposed interiorly near one end of said sleeve, thereby leaving a marginal portion of said sleeve extending beyond the panel, means for supporting and advancing said tape to position one free end thereof adjacent said marginal portion, means for adhering said tape to said sleeve in a position overlying said marginal portion and extending beyond the free end of said portion on rotation of said sleeve, means for inwardly folding said marginal portion and said adhered tape on rotation of said sleeve, whereby said marginal portion and tape will overlie the peripheral portion of said panel, a serrated wheel mounted for rotational movement about an axis generally normal to the sleeve axis at one end of said sleeve, means for rotating said wheel, and means for bringing said rotating wheel into contact with the inwardly folded portion of the tape both to compress the same against said panel and marginal portion and rotate the sleeve about its axis, the wheel compressing the tape and marginal portion together into a series of undulations.

20. Apparatus as defined in claim 19, wherein the means for supporting said sleeve and panel comprises a rotatable mandrel.

21. Apparatus as defined in claim 19, wherein the tape has an adhesive on one side, a rotatable roller at one side of the path of advance of said tape and in a position adjacent said sleeve, and means for causing relative movement between said roller and sleeve to press said tape against said sleeve and thereby adhesively adhere said tape to said sleeve.

22. Apparatus as defined in claim 19, wherein said means for inwardly folding said marginal portion comprises a rotatable roller disposed adjacent the path of said tape, said second roller having a circumferentially extending radial projection adapted to inwardly fold said marginal portion, and means for causing relative movement between said sleeve and said roller to place said marginal portion against said radial projection.

23. Apparatus as defined in claim 19, wherein said serrated wheel is adapted to provide undulations of greater extent at the inner peripheral edge of the inwardly folded portion of said tape.

24. Apparatus as defined in claim 19, plus means for guiding said tape along a path which is tangential to the path taken by said marginal portion upon rotation of said sleeve.

25. Apparatus for combining a circular, deformable sleeve having a continuous side wall defining an open end, a deformable panel adapted to fit within said sleeve, and a length of tape into a liquid-tight container, comprising, means for supporting said sleeve for rotational movement about its central axis with said panel disposed interiorly of said sleeve adjacent but spaced inwardly from said open end, thereby leaving a marginal portion of said sleeve extending beyond said panel, means for positioning one free end of said tape adjacent to said marginal portion, means for adhering said tape to said sleeve in a position overlying said marginal portion and extending beyond the end of said sleeve on rotation of said sleeve, means for inwardly folding said marginal portion and tape on rotation of said sleeve, whereby said marginal portion and said tape overlie said panel, a serrated wheel mounted for rotational movement about an axis, means for rotating said wheel, and means for bringing said wheel ino contact with the overlying portion of the tape with its axis of rotation being substantially normal to the central axis of the sleeve, whereby on rotation of said wheel, said tape will be adhered to said sleeve, said tape and marginal portion will be inwardly folded to overlie said panel, and said tape, marginal portion, and panel will be compressed together in face-to-face contact by a series of uniform undulations.

26. Apparatus for combining a circular paperboard sleeve, a paperboard end panel, and an adhesive tape into a drum-like container, comprising at least one rotatable mandrel for supporting said sleeve for rotation about its axis, said mandrel including a member for supporting and positioning said panel within and spaced from one end of said sleeve, thereby leaving a marginal portion of said sleeve extending axially beyond said panel, means for supporting and feeding out one end of a roll of said tape to a position proximate said marginal portion, means for wetting said tape, at least one rotatable roller arranged to radially press said tape to said sleeve in a position overlying said marginal portion and extending axially beyond said marginal portion, at least one rotatable roller arranged to apply radial pressure to inwardly fold said marginal portion and the tape bonded thereto to overlie said end panel, a rotatable serrated forming wheel, means for rotating said wheel, means for lowering said wheel onto said infolded portions with its axis substantially normal to the axis of the sleeve, thereby compressing said infolded portions and tape into an annular series of radial undulations conforming to said serrations, the axially extended tape being pressed into firm engagement with the end panel, and means for severing said tape to create a length of tape sufficient to encircle said sleeve.

27. Apparatus as defined in claim 26, wherein at least two mandrels are provided, and means for supporting said mandrels to allow a container to be formed on one mandrel, while the other mandrel is accessible for loading and unloading.

28. Apparatus as defined in claim 26, plus means for applying wax to the surface opposite the adhesively coated surface of said tape.

29. Apparatus as defined in claim 26, wherein the mandrel is substantially vertical, and the tape is fed out on edge in a vertical plane and substantially tangential to the marginal portion of the sleeve.

30. Apparatus as defined in claim 26, wherein the wetting means includes a bristle brush.

31. Apparatus as defined in claim 26, wherein the tape cut-off means includes a knife edge positioned transversely to the path of the tape and arranged to sever the tape prior to the tape being wetted.

32. Apparatus as defined in claim 26, and means for longitudinally scoring said tape prior to the tape being wetted by the wetting means.

33. Apparatus for combining a circular paperboard sleeve, a paperboard end panel, and a length of adhesive tape into a drum-like container, comprising at least one rotatable mandrel for supporting said sleeve for rotation about its axis, said mandrel including a member for supporting and positioning said panel within said sleeve and spaced from one end thereof, thereby leaving a marginal portion of said sleeve extending axially beyond said panel, means for supporting and feeding one free end of a roll of said tape along a path to a position proximate said marginal portion, the terminal end of said path being tangential to said marginal portion, a first rotatable roller, a second rotatable roller having an annular radial projection, means for effecting relative movement between said mandrel and rollers to cause said rollers to apply radial pressure to said sleeve along said marginal portion, said first roller being arranged to adhere said tape to said sleeve in a position overlying said marginal portion and extending axially beyond said marginal portion, said second roller being arranged to cause said projection to inwardly fold said marginal portion and the tape adhered thereto, a rotatable serrated forming wheel, means for rotating said wheel, means for lowering said wheel onto said infolded portions with its axis substantially normal to the axis of the sleeve, to form an annular series of radial serrations or undulations and press the axially extended tape into firm engagement with the end panel, and means for severing said tape to provide a length of tape at least as long as the circumference of said sleeve.

34. In an apparatus for assembling a circular paperboard sleeve, and a paperboard end panel into a drum-like container, means for supporting said sleeve for rotation about its axis, means for supporting and positioning said end panel within and spaced from one end of said sleeve, thereby leaving a marginal portion of said sleeve extending axially beyond said panel, means for applying radial deforming pressure to inwardly fold said marginal portion to overlie the periphery of said panel, and means for applying axial deforming pressure to compress marginal portion and panel into an annular series of radial undulations.

35. Apparatus as defined in claim 34, wherein said last-mentioned means includes a serrated forming wheel.

36. Apparatus as defined in claim 34, wherein said undulations are of progressively greater extent as they approach the inner peripheral edge of said marginal portion.

37. In the method of forming a circular drum-type container having a continuous sidewall with a portion inwardly folded to form a ledge, a panel disposed interiorly of said container and adjacent said ledge, and an adhesive material located between said panel and ledge, the step which comprises, compressing said ledge, adhesive material and panel together to form an annular series of radial undulations, and adhesively bond said ledge and panel, thereby providing a liquid-tight seam between the ledge and panel.

38. The method according to claim 37 wherein said ledge, adhesive material, and panel are deformed to provide an annular series of substantially uniform radial undulations having a greater depth at the inner peripheral portions of said ledge and panel than at the outer peripheral portions thereof.

39. The method according to claim 37 wherein said ledge, adhesive material and panel are progressively compressed together, and said ledge and panel are turned about a common center of rotation through at least 360 degrees as said compression is accomplished.

References Cited in the file of this patent

UNITED STATES PATENTS

| | | |
|---|---|---|
| 1,092,688 | Brooks | Apr. 7, 1914 |
| 1,764,688 | Palmer et al. | June 17, 1930 |
| 2,027,664 | Andrew et al. | Jan. 14, 1936 |
| 2,035,375 | Phillips | Mar. 24, 1936 |
| 2,324,572 | Frederick et al. | July 20, 1943 |
| 2,403,377 | Kelley | July 2, 1946 |
| 2,651,977 | Wilcox et al. | Sept. 15, 1953 |
| 2,758,522 | Baxter et al. | Aug. 14, 1956 |
| 3,012,483 | Leibrich | Dec. 12, 1961 |